(12) United States Patent
Rampf

(10) Patent No.: US 8,277,096 B2
(45) Date of Patent: Oct. 2, 2012

(54) LIGHT ARRANGEMENT, METHOD FOR OPERATING A LIGHT ARRANGEMENT AND A MOTOR VEHICLE

(75) Inventor: Klaus-Dieter Rampf, Tübingen (DE)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 12/029,269

(22) Filed: Feb. 11, 2008

(65) Prior Publication Data

US 2008/0198612 A1    Aug. 21, 2008

(30) Foreign Application Priority Data

Feb. 15, 2007   (DE) .................. 10 2007 007 466

(51) Int. Cl.
 *F21V 21/28*  (2006.01)
 *F21V 33/00*  (2006.01)
 *F21V 1/00*   (2006.01)
 *B60Q 1/00*   (2006.01)

(52) U.S. Cl. .................. 362/464; 362/506; 362/509

(58) Field of Classification Search .............. 362/509, 362/512, 513, 464, 465, 466, 488, 489, 490, 362/40; 180/335, 446, 421; 280/5.514, 5, 280/515, 5.519

See application file for complete search history.

(56) References Cited

U.S. PATENT DOCUMENTS

| | | | |
|---|---|---|---|
| 3,310,669 A | 3/1967 | Dils | |
| 5,023,758 A * | 6/1991 | Allen et al. | 362/514 |
| 5,089,942 A * | 2/1992 | Sekiguchi | 362/509 |
| 5,632,503 A | 5/1997 | Raad et al. | |
| 5,673,990 A * | 10/1997 | Neumann et al. | 362/513 |
| 5,681,103 A * | 10/1997 | Remillard et al. | 362/551 |
| 6,470,248 B2 | 10/2002 | Shank et al. | |
| 6,767,119 B2 * | 7/2004 | Tseng | 362/465 |
| 6,913,375 B2 * | 7/2005 | Strazzanti | 362/513 |
| 7,066,630 B1 * | 6/2006 | Venkatram | 362/489 |
| 7,157,856 B2 | 1/2007 | Chon et al. | |
| 7,252,418 B2 * | 8/2007 | Enders | 362/464 |
| 2004/0002789 A1 | 1/2004 | Hachtel | |
| 2004/0027834 A1 | 2/2004 | Chigusa et al. | |

FOREIGN PATENT DOCUMENTS

| | | |
|---|---|---|
| CN | 2099043 U | 3/1992 |
| DE | 19642467 A1 | 4/1998 |
| DE | 10355747 A1 | 3/2005 |
| EP | 1388461 A2 | 11/2004 |
| FR | 1101545 A | 10/1955 |
| FR | 2581734 A1 | 11/1986 |
| GB | 178234 A | 4/1922 |
| GB | 2343214 A | 5/2000 |

OTHER PUBLICATIONS

European Search Report dated Jun. 30, 2008, issued in Application No. 08000048.2.

(Continued)

*Primary Examiner* — David Crowe

(74) *Attorney, Agent, or Firm* — Ingrassia Fisher & Lorenz, P.C.

(57) ABSTRACT

The invention relates to a light arrangement, comprising a motor vehicle light which can be operated in at least two operating modes, as well as further comprising a control mechanism for the motor vehicle light. The invention further relates to a method for operating a motor vehicle light and a motor vehicle.

19 Claims, 4 Drawing Sheets

OTHER PUBLICATIONS

German Search Report dated Oct. 6, 2009, issued in Application No. 10 2007 007 466.4.
USPTO, Office Action for U.S. Appl. No. 12/910,463, dated Jan. 31, 2011.
Response to Office Action for U.S. Appl. No. 12/910,463, dated Apr. 13, 2011.
USPTO, Final Office Action for U.S. Appl. No. 12/910,463, dated May 2, 2011.
Response to Final Office Action for U.S. Appl. No. 12/910,463, dated May 2, 2011.

* cited by examiner

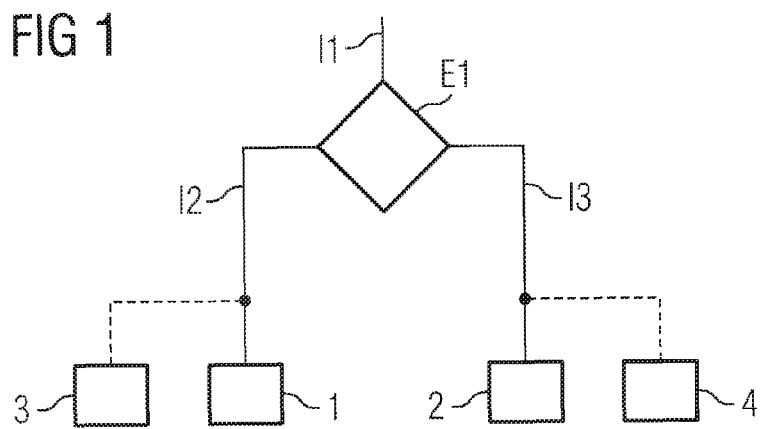
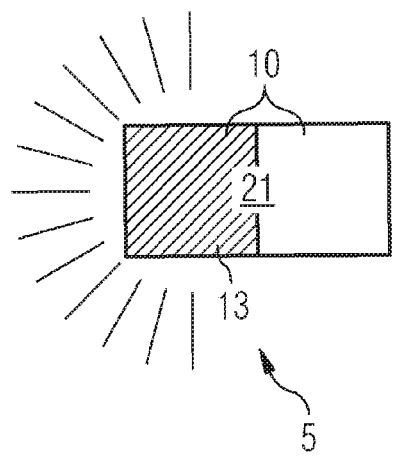
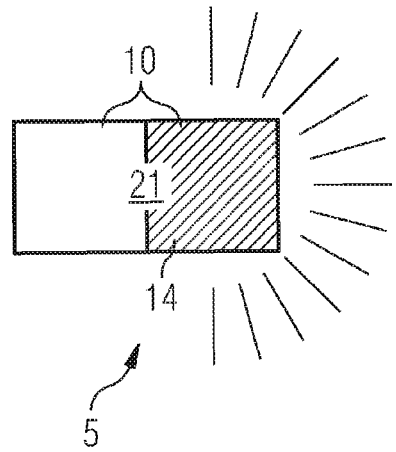
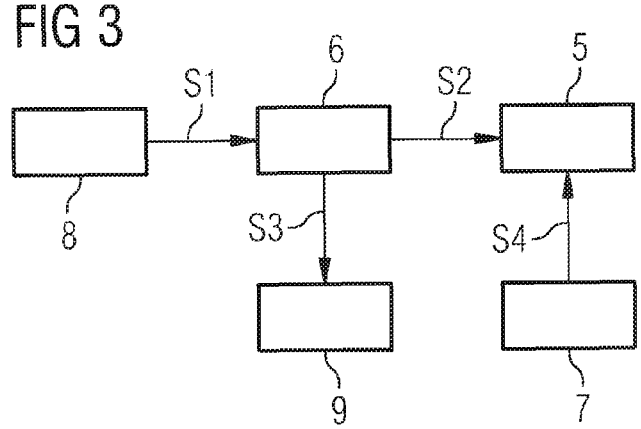

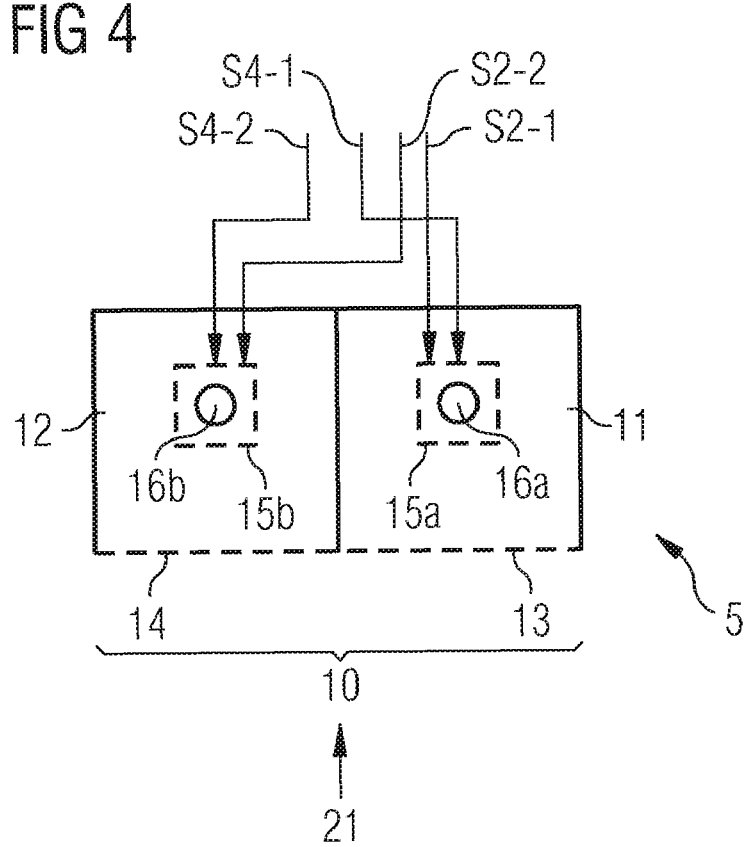
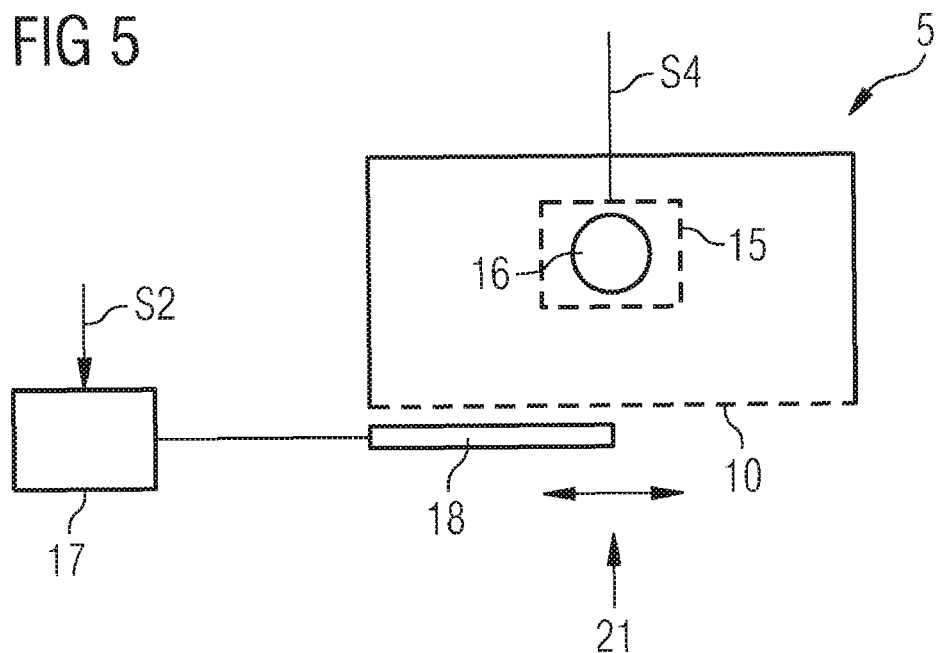

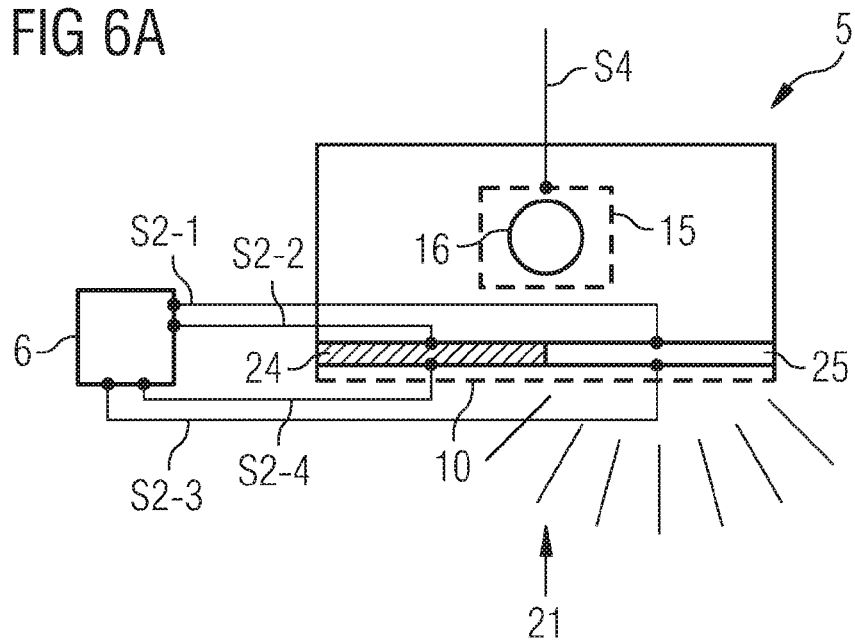
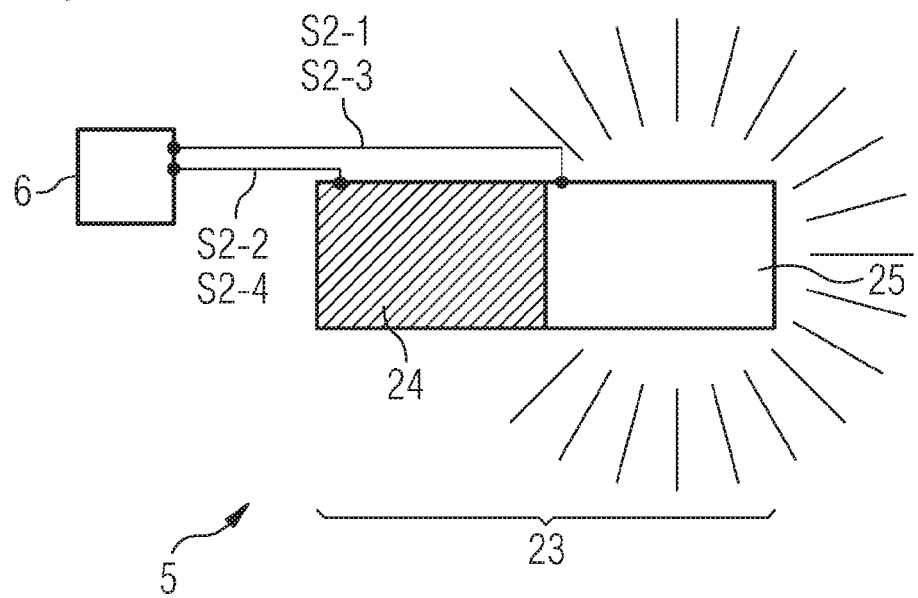

LIGHT ARRANGEMENT, METHOD FOR OPERATING A LIGHT ARRANGEMENT AND A MOTOR VEHICLE

CROSS-REFERENCE TO RELATED APPLICATION

This application claims priority to German Application No. DE 10 2007 007 466.4, filed Feb. 15, 2007, which is hereby incorporated in its entirety by reference.

TECHNICAL FIELD

The invention generally relates to a lighting, and more particularly to light arrangement, a method for operating a light arrangement and a motor vehicle.

BACKGROUND

It is generally known that a vehicle user can adapt different systems of a motor vehicle to a desired operating type. Thus, it is possible, for example, in modern motor vehicles, to select between a comfort mode and a sport mode. The respectively selected mode, inter alia, influences a feel of driving affected by the setting of the suspension, the stiffness of the steering or the throttle response. For example, when a sport mode is selected, the suspension becomes firmer, the steering more direct and the throttle response more spontaneous. This possibility for the vehicle user to exert an influence is based on the desire to possess two vehicles with different functions in one.

In addition to this adaptation of the technical motor vehicle properties, the vehicle user would also like to make a sporty mode of driving clear by the visual appearance of the motor vehicle. A flexible adaptation of the exterior to a discrete/serious or to a sporty appearance of the motor vehicle is possible by adapting the motor vehicle lights, in particular, as these substantially contribute to forming the character of the motor vehicle. An adverse effect on other road users or even a risk to traffic safety must not, however, be allowed to occur.

Accordingly, it is desirable to provide a more flexible design of the motor vehicle lights. In addition, it is desirable to provide a method for operating a light arrangement. Furthermore, other desirable features an characteristics will become apparent from the subsequent detailed description and the appended claims, taken in conjunction with the accompanying drawings and the foregoing background.

SUMMARY

According to an exemplary embodiment, a light arrangement with a controllable motor vehicle light is provided, the light having a light housing and an at least partially transparent light glass and at least one light source being arranged in the light housing. Furthermore, a control device is connected to the motor vehicle light, which is designed to operate the motor vehicle light in at least two operating modes. In a first operating mode, light generated by the light source is only radiated by way of a first portion of the light glass and, in a second operating mode, light generated by the light source is radiated by way of a second portion of the light glass, which is at least partially different from the first portion.

Furthermore, a method for operating a light is provided, the light having at least one light source and at least one partially transparent light glass. The light can be operated by the method according to an embodiment in at least two operating modes. In a first operating mode, light generated by the light source is radiated by way of a first portion of the light glass and, in a second operating mode, light generated by the light source is radiated by way of a second portion of the at least partially transparent light glass which is at least partially different from the first portion.

Furthermore, a motor vehicle according to the invention is provided, which contains the light arrangement according to the invention.

The invention is based on the idea of accommodating the wish of a vehicle user to still be able to modify the appearance of his motor vehicle retrospectively. By adapting the appearance of the motor vehicle lights, the vehicle user in particular acquires the possibility of combining a plurality of motor vehicles in a single motor vehicle with regard to the exterior. As the motor vehicle lights exert a substantial influence on the appearance of the motor vehicle, merely by changing the appearance of the lights, the entire exterior of the motor vehicle can be significantly changed.

In addition, the settable operating modes of the lights satisfy designer aspects. By means of a light arrangement of this type it is possible for the vehicle user, virtually at the press of a button, to not only influence the characteristic properties or "feel of driving", for example affected by vehicle systems such as the suspension or the steering, but moreover to also influence the external appearance of his motor vehicle. In the process, the function of the respective motor vehicle lights is not influenced, or only insubstantially.

The first portion is preferably completely different from the second portion. Thus, light is radiated, in the first operating mode, from a completely different portion of the at least partially transparent light glass than in the second operating mode. This ensures a clear distinction between the operating modes.

Furthermore, the motor vehicle light in the first operating mode has the same function as in the second operating mode. This feature ensures that the respective light retains the respectively associated function regardless of the operating mode. Thus, neither the vehicle user nor other road users are adversely affected by an irritating light radiation of the respective motor vehicle light.

Furthermore, the motor vehicle light, with the same function, preferably has approximately the same light direction, light intensity and/or illumination or signal effect. Thus, for example, the requirement of the full beam exists to intensively illuminate the region in front of the motor vehicle. This intense illumination must be possible in each of the operating modes. The signal effect of a direction indicator and/or a brake light must not be adversely affected for example, either. These motor vehicle lights still have to be recognisable as such by other road users. Deviations in the different operating modes with regard to light intensity, light direction and/or illumination and/or signal effect are permissible to that effect within a certain prescribed framework. This ensures, in particular, that the traffic situation is not affected.

In a development which is particular easy and economical to implement, the motor vehicle light has two light sources, a first light source being associated with the first operating mode and a second light source being associated with the second operating mode. A change in the external appearance of the light and therefore also of the vehicle can be achieved in that, in the first operating mode, the first light source is provided with electric energy and, in a second operating mode, the second light source is provided with electric energy from an energy source. If the first and the second light source each contain a plurality of lighting means, by providing two light sources, a differentiated exterior of the motor vehicle light and therefore of the vehicle can already be achieved.

This is possible merely by skilled arrangement of the lighting means of the respective light source in the motor vehicle light.

The motor vehicle light moreover preferably has at least two chambers that are separate from one another, the first light source being arranged in the first chamber and the second light source being arranged in the second chamber. One wall of the respective chamber is in each case configured as a portion of the at least partially transparent light glass. This makes it possible for only the portion of the at least partially transparent light glass associated with the respective chamber to radiate light regardless of whether the light source of the first chamber or the light source of the second chamber is supplied with electric energy. It is easily possible to adapt the design depending on the respective operating mode by means of the dimensions of the chamber and the at least partially transparent light glass and the number of lighting means.

In an alternative, also preferred configuration, it is possible to supply all the light sources simultaneously with electric energy and nevertheless to achieve a differentiated exterior of the motor vehicle light. This is possible with the aid of an opaque covering screen, with which defined regions of the at least partially transparent light glass are covered. Due to this covering, light is only radiated from the uncovered portions of the at least partially transparent light glass. To implement this covering, a switch-over device is provided, which moves the covering screen into different positions of the light screen. In this case, a first position may, for example, be associated with a first operating mode and a second position to a second operating mode. Depending on the operating modes set, only the uncovered portion of the at least partially transparent light glass radiates light emitted from the light source. In a system of this type it is possible to use only one light source and nevertheless to vary the appearance of the motor vehicle light and therefore of the vehicle per se. Furthermore, a plurality of design possibilities for the covering screen is conceivable. By means of recesses and openings, which can be implemented in virtually any shapes, it is easily and economically possible to adapt the design of the motor vehicle light. It would moreover also be conceivable for the covering screen to be retrospectively exchanged and for the design of the motor vehicle light to be adapted to new requirements of the vehicle user.

The motor vehicle light also preferably has a further light glass, the transparency of which is configured to be electrically variable. A light glass of this type with variable transparency allows the emitted light fraction of the motor vehicle light to be set in a simple manner. A light glass of this type can be integrated without any problems into a motor vehicle light. In addition, older motor vehicles can also be retrospectively equipped with a light glass of this type.

The further light glass also preferably has liquid crystals, the transparency of which changes depending on an applied voltage. It is to be regarded as advantageous in such liquid crystals that the transparency of a glass may be significantly changed by them and the current consumption of these crystals is nevertheless decidedly low. In addition, the transparency of the glass, which has such liquid crystals, can be changed with very short reaction times in the millisecond range.

Furthermore, the further light glass has at least a first and a second glass segment, the transparency of the two glass segments being electrically variable independently of one another. In the first operating mode, the transparency of the first glass segment and, in the second operating mode, the transparency of the second glass segment is also preferably varied. By using various glass segments, each of the glass segments being associated with an operating mode, the optical appearance of the light can be varied very easily. In addition, this further light glass may be divided into a plurality of different glass segments, a certain number of glass segments being associated with a first operating mode and glass segments that are different therefrom being associated with a second operating mode. It is also possible for the first and/or the second operating mode to use glass segments, which are associated with the respective other operating mode. This can be applied to virtually any number of operating modes with a respectively adapted exterior of the motor vehicle light.

The further light glass is also preferably connected to the control device, which controls the operating modes. In a control device of this type, the information may advantageously be stored, for example, which glass segments are associated with which operating mode. If the appearance of the motor vehicle light is to be retrospectively changed, it is possible to reprogram the control device accordingly, so that the transparency of other glass segments changes. A retrospective adaptation of the exterior of the motor vehicle light depending on the operating mode is therefore easily possible.

The further light glass is also preferably arranged parallel to the at least partially transparent light glass. It is thus possible to also retrospectively install a transparency-variable light glass of this type retrospectively in a motor vehicle light. It is therefore possible to retrofit older motor vehicles.

The further light glass is also preferably installed in the motor vehicle light instead of the at least partially transparent light glass. This installation variant may be used particularly advantageously during the integration of a light glass of this type into a motor vehicle light of a new car. The outlay for assembly of an additional glass is therefore dispensed with.

Furthermore, according to a preferred embodiment, a selection device connected to the control device is provided to specify the respective operating mode. This selection device may, for example, be designed as a manual change-over switch and arranged in the passenger compartment. It is thus possible for the vehicle user to select the external appearance of the motor vehicle light as desired. Furthermore, the selection device may be integrated into the motor vehicle in such a way that a switch-over is made between the first and second operating mode depending on driving parameters. One of these parameters may, for example, be the vehicle speed.

Furthermore, a display device connected to the control device is preferably provided, the display device displaying the operating mode set. This display device may implement the display in analogue form, digitally, by illuminated pictograms or the like. The display device is preferably arranged in the passenger compartment. This device means that the vehicle user can find out at any time which operating mode is set. The illuminated pictograms are expediently arranged directly on the selection device. This allows a simple allocation of the display to the function of the different light radiation of the motor vehicle light.

Furthermore, not only the visual appearance of a front light is changed, but also the appearance of other motor vehicle lights, such as, for example the tail lights. The visual appearance of brake lights or direction indicators may preferably be varied. If different motor vehicle lights are adapted at the same time depending on the operating mode with regard to their visual appearance, it is possible to create a type of design theme, which gives the motor vehicle an overall pleasing exterior.

The lighting means associated with the light sources are preferably implemented as incandescent lamps, light-emitting diodes, halogen lamps, gas discharge lamps or the like. Depending on the lights, it is advantageous if different lighting means are used. Thus energy saving is advantageously also possible.

A method for operating a light, in particular a light for a motor vehicle is preferably also provided. The light to be operated in this case has at least one light source with at least one lighting means. Furthermore, the light contains at least one partially transparent light glass. The light is operated by the method such that, in a first operating mode, light generated by the light source is radiated by way of a first portion of the at least partially transparent light glass and, in a second operating mode light generated by the light source is radiated by way of a second portion of the at least partially transparent light glass. Operation of the light in different operating modes is made possible for the first time by this method.

In a first method variant for operating a motor vehicle light, a first light source is preferably controlled in the first operating mode and a second light source is controlled in a second operating mode.

In a second method variant for operating a motor vehicle light, a first portion of the at least partially transparent light glass is covered in the first operating mode and in the second operating mode a second portion thereof is covered.

In the two method variants, a selection device specifies whether the first or the second operating mode exists.

Furthermore, characteristic properties of further systems contained in the motor vehicle, in particular a suspension and/or steering system and/or an instrument illumination are preferably varied by the method according to the invention depending on the specified operating mode. As a result, not only the exterior of the motor vehicle but furthermore also its driving properties (e.g., feel of driving) are changed thereby. By means of the change, both in the driving properties and also in the external appearance, the impression is conveyed both to the vehicle user and also to other road users, depending on the operating mode, that a sporty or a discrete-serious vehicle is present.

A motor vehicle is preferably also provided, having a light arrangement which can be operated in a plurality of operating modes. In this case, the at least one motor vehicle light is integrated into the body of the motor vehicle. The control device and the energy source may be arranged at virtually any point within the body, such as for example the engine compartment or the boot. Furthermore, the selection device or the display device is expediently arranged at a point in the passenger compartment which is easily reachable or visible to the vehicle users.

BRIEF DESCRIPTION OF THE DRAWINGS

The present invention will hereinafter be described in conjunction with the following drawing figures, wherein like numerals denote like elements, and FIG. 1 shows a flow chart in which the important control commands, decisions and operating modes are shown;

FIG. 2a shows a stylised motor vehicle light in the first operating mode;

FIG. 2b shows a stylised motor vehicle light in the second operating mode;

FIG. 3 shows a block diagram of the light arrangement according to the invention according to a preferred embodiment;

FIG. 4 shows a motor vehicle light in a first preferred embodiment;

FIG. 5 shows a motor vehicle light in a second preferred embodiment;

FIGS. 6a, 6b show a motor vehicle light in a third preferred embodiment;

DETAILED DESCRIPTION

Figure 7:
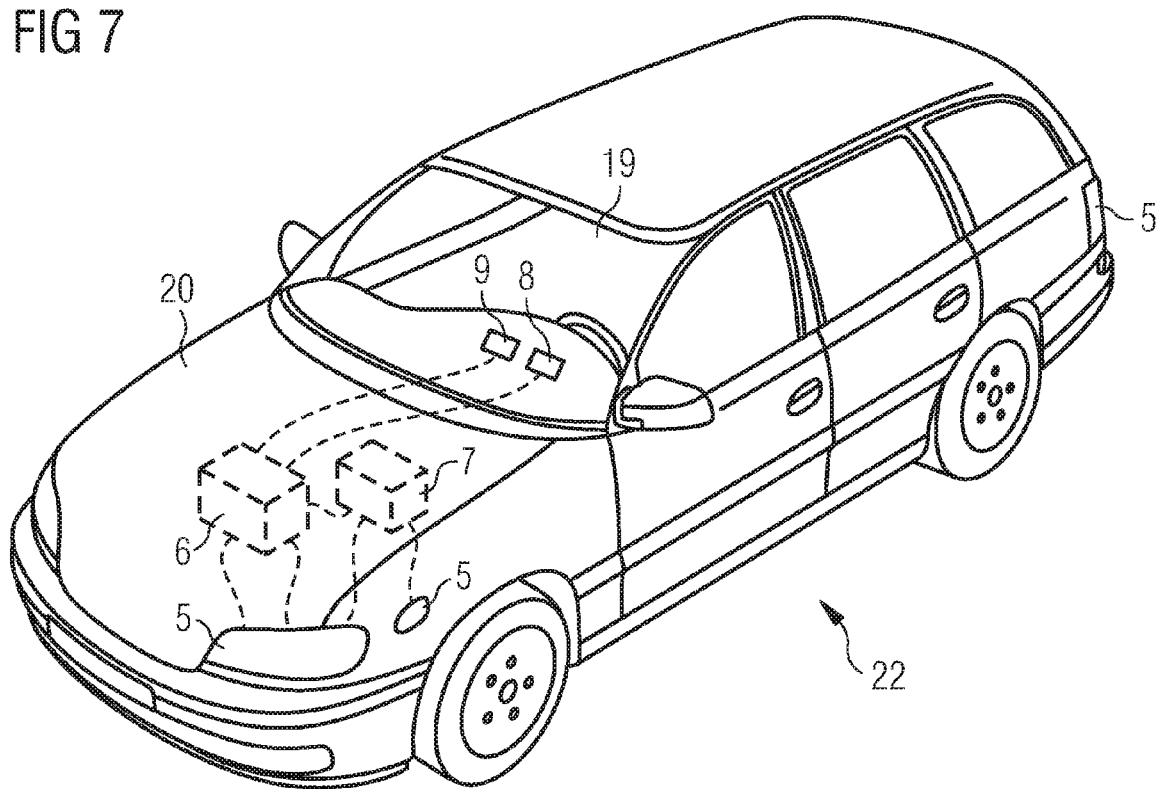
FIG. 7 shows a motor vehicle, which contains the light arrangement according to the invention according to the preferred embodiment from FIG. 3.

The following detailed description is merely exemplary in nature and is not intended to limit the application and uses. Furthermore, there is no intention to be bound by any theory presented in the preceding background or the following detailed description.

In the Figures of the drawings, the same reference numerals designate the same or functionally the same components, inasmuch as nothing to the contrary is disclosed.

By way of example, the functioning principle will be described below with the aid of two operating modes, it being obvious that more than two operating modes are also possible. It is moreover obvious that the term "motor vehicle light" used below includes all lights, which a motor vehicle has. Thus, the term "motor vehicle light" does not only include front lights, but also tail lights, direction indicators or brake lights and all other lights provided on a motor vehicle.

FIG. 1 shows the important decisions, control commands and operating modes. At the beginning, a control command I1 is present, which contains information about which operating mode is to be present. This control command I1 is interpreted by decision logics E1. A control command I2 or I3 is then relayed, which contains information about whether in particular the motor vehicle light should be transferred into a first or second operating mode. If the motor vehicle light receives a control command I2, light is radiated from the motor vehicle light in a first variant to provide a first external appearance. Moreover, when the first operating mode is present not only the light radiation characteristics of a motor vehicle light can be changed, but further systems of the motor vehicle may also be manipulated. A system of this type may be, for example, the throttle response, the steering, the interior lighting and the suspension. For example, vehicle systems affecting a feel of driving are manipulated to provide a first feel of driving. Analogously to the first operating mode, in a second operating mode, not only the type of light radiation 2 of the motor vehicle light is changed to provide a second external appearance, but also characteristic properties of the systems already mentioned to provide a second feel of driving. Changes to other systems are also conceivable depending on the operating mode present.

FIG. 2a shows the motor vehicle light 5 in a front view, radiating light in one operating mode. FIG. 2b shows a motor vehicle light 5 in a front view, radiating light in a second operating mode. The front 21 of the light radiating light is marked in each case. The motor vehicle light has an at least partially transparent light glass 10. Depending on the operating mode present, the motor vehicle light radiates light from different portions 13, 14 of this at least partially transparent light glass. In the embodiment shown in FIG. 2a, the first operating mode is present and light is radiated from the first portion 13 of the at least partially transparent light glass 10. On the other hand, in the embodiment shown in FIG. 2b, the second operating mode is present and light is radiated from the second portion 14.

FIG. 3 shows the important components of a mechanism according to a preferred embodiment of the present invention. The motor vehicle light 5 is connected by an energy line S4 to an energy source 7. Furthermore, the motor vehicle light 5 is connected by the light control line S2 to the control device 6. The control device 6 is in turn connected to the selection device 8 by way of a selection control line S1. Furthermore, the control device 6 is connected to the display device 9 by way of the display control line S3.

A selection can be made between a first and a second operating mode by way of the selection device 8. This selection device 8 may, for example, be a manual change-over switch. It is furthermore possible for the selection device 8 to interpret certain parameters of the motor vehicle and for the operating mode to be specified depending on these parameters. Thus, it would be possible for example, in a defensive manner of driving or a first feel of driving, to activate the comfort mode, whereas with a sporty manner of driving or a second feel of driving, the sport mode is controlled. The information as to which operating mode is present is relayed from the selection device 8 by way of the selection control line S1 to the control device 6. This information is now converted by the control device 6 into a form which is suitable for the display device 9. The necessary signals to display the present operating mode are received by the display device 9 by way of the display control line S3 from the control device 6. Moreover, the control device 6 processes the information as to which operating mode is present such that the motor vehicle light 5 radiates light according to the present operating mode. The motor vehicle light 5 receives this information from the control device 6 by way of the light control line S2. Moreover, the motor vehicle light 5 has to be supplied with energy. This is ensured by an energy source 7, which is connected to the motor vehicle light 5 by way of an energy line S4. This energy source may, for example, be a car battery or a generator FIG. 4 shows a detailed first embodiment of the motor vehicle light 5 with a front 21 indicated. The motor vehicle light 5 has an at least partially transparent light glass 10 and a first chamber 11 as well as a second chamber 12. In this case, the first chamber 11 is limited by a first portion 13 of the light glass 10. The second chamber 12 is limited by a second portion 14 of the light glass 10. The first chamber contains a first light source 15*a*, which in turn has at least one lighting means 16*a*. The second chamber 12 has a second light source 15*b*, which also contains at least one lighting means 16*b*. The light sources 15*a*, 15*b* of the respective chamber are connected by way of the light control lines S2 to the control device 6 and furthermore by way of the energy lines S4 to the energy source 7.

If the first operating mode is present, a control signal is sent to the light source 15*a* in the first chamber 11 by way of a first light control line S2-1. This first light source 15*a* then obtains current by way of the energy line S4-1 from the energy source 7. The lighting means 16*a* of the first light source 15*a* then emit light. This light can only be radiated by the first portion 13 of the at least partially transparent light glass 10. It is obvious that owing to the number of lighting means 16*a*, different dimensions of the first chamber 11 and furthermore the shape of the first portion 13 of the at least partially transparent light glass 10, a plurality of design possibilities are provided with regard to the radiated light in the first operating mode.

Corresponding to the previous statements, in the second operating mode, a command is sent by way of the light control line S2-2 to the second light source 15*b* in the second chamber 12. The light source 15*b* then obtains energy from the energy source 7 by way of the energy line S4-2. Thereupon, the second lighting means 16*b* of the second light source 15*b* emit light. This light is only radiated from the second portion 14 of the at least partially transparent light glass 10. A multiplicity of designs is also possible here corresponding to the specification already made. Furthermore, it is obvious that depending on the number of operating modes, more than two chambers may be provided, each of these chambers having a light source 15.

FIG. 5 shows a detailed motor vehicle light 5 in a second embodiment. The front 21 is indicated. This motor vehicle light has an at least partially transparent light glass 10. Furthermore, the motor vehicle light 5 contains a light source 15, which has lighting means 16. The light source 15 is supplied with energy from the energy source 7 by way of the energy line S4. Furthermore, the motor vehicle light 5 has a switch-over device 17, which moves an opaque covering screen 18. The switch-over device 17 receives commands by way of the light control line S2.

If the motor vehicle light 5 is controlled, the light source 15 permanently obtains current by way of the energy line S4. Which portions of the at least partially transparent light glass radiate light emitted from the light source depends on the position of the covering screen 18 at the at least partially transparent light glass 10. The position of the covering screen 18 can be varied by the switch-over device 17. The switch-over device 17 moves the covering screen 18 in such a way that the latter covers defined portions of the at least partially transparent light glass 10. Which portion of the light glass 18 is covered depends on the present operating mode. A control command with the information about which operating mode is present is received by the switch-over device 17 by way of the light control line S2. If the switch-over device 17 receives the command that the first operating mode is present, the switch-over device 17 moves the covering screen 18 into a first position and exposes the first portion of the at least partially transparent light glass 10. Because of the partial covering of the at least partially transparent light glass 10 by the covering screen 18, light can only be emitted from the uncovered first portion of the at least partially transparent light glass. If the second operating mode is present, the covering screen 18 is moved into a second position and a second portion of the at least partially transparent light glass 10 is exposed. Accordingly, light can only be emitted in this operating mode from the second, uncovered portion of the light glass 10.

It can be seen that the number of positions which the covering screen can adopt depends on the number of operating modes. Furthermore, it is also possible to move different covering screens simultaneously depending on the operating mode present into a respectively predetermined position. Complex coverings of the light glass 10 and therefore complex light radiation patterns are therefore possible depending on the respectively present operating mode.

FIGS. 6*a* and 6*b* show a detailed motor vehicle light 5 according to a third preferred embodiment in different views. The front 21 of the motor vehicle light 5 is indicated. This motor vehicle light 5 has an at least partially transparent light glass 10. A further light glass 23, the transparency of which is electrically variable, is installed parallel to this partially transparent light glass 10. However, it is obvious that this further light glass 23 does not inevitably have to be installed parallel to the partially transparent light glass 10, but may also replace it. The motor vehicle light 5 also contains a light source 15 with lighting means 16. This light source 15 is supplied with energy from the energy source 7. The further light source 23 is divided into two glass segments 24 and 25. However, it is obvious that not only two glass segments but substantially more glass segments are possible. In the embodiment shown, the first glass segment 24 is connected by the control device 6 by way of a control line S2-2 as well as with a control line S2-4.

If the motor vehicle light 5 is switched on, the light source 15 contained in the motor vehicle light 5 permanently obtains current by way of the energy line S4. Which part of the motor vehicle light 5 radiates light to what extent depends on the transparency of the first and/or second glass segment 24 and 25. In the embodiment shown, the first glass segment 24 has only slight transparency. Accordingly, the motor vehicle light 5 does not radiate any light in the region of the first glass segment 24. The transparency of the respective glass segment 24 and/or 25 is set by the control device 6. The latter is in each case electrically connected by way of two control lines S2-2 and S2-4 or S2-1 and S2-3 to the respective glass segment 24 or 25. The contacting by means of the control device generally takes place on either side of the respective glass segment 24 or 25. If a potential difference prevails between the two sides of the respective glass segment, a rotation of the liquid crystal molecules occurs in the glass segment under the influence of the electrical field being produced. The transparency of this glass segment is reduced and a passage of light is therefore reduced. Accordingly, light from the motor vehicle light 5 can only be radiated in the region of glass segments with a high transparency.

Beyond the embodiment shown, it is possible to equip the transparency-variable further light glass with virtually any number of different glass segments. A combined control of different glass segments allows virtually any number of different operating modes to be implemented thereby. To make this possible, each of the glass segments is connected by control lines S2-x to the control device 6. The transparency of defined glass segments is changed by the control device 6 depending on the selected operating mode. This allows the position and number of glass segments to be controlled to be changed depending on the respective operating mode by a reprogramming of the control device 6. The outer appearance can then also be changed retrospectively depending on the respective operating mode.

FIG. 7 shows a motor vehicle with the light arrangement according to the invention. The motor vehicle has a passenger compartment 19 as well as a body 20. The selection device 8 as well as the display device 9, is provided in the passenger compartment in this embodiment. Motor vehicle lights 5 are arranged inside the body 20. Moreover, the control device 6 as well as the energy source 7 are provided inside the body 20. The motor vehicle lights 5 shown can be operated in different operating modes. If an operating mode is now specified by the vehicle user by means of the selection device 8, this information is communicated to the control device 6. The latter in turn relays suitable control signals to a display device 9 to display the present operating mode to the vehicle user. Furthermore, the control device relays control commands to the vehicle light or lights, so the lights radiate light according to the present operating mode.

Although the present invention has been described above with the aid of preferred embodiments, it is not limited thereto, but can be modified in a diverse manner. Thus, the at least partially transparent light glass or the covering screen may themselves have a certain colouring. It is also possible for additional lights to be arranged on the motor vehicle to emphasise the respectively selected operating mode. Different lighting means may also be used in a housing for example an incandescent lamp for the front lights and a light-emitting diode for a direction indicator in the same housing.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A motor vehicle comprising:
   a controllable exterior motor vehicle light, which has a light housing with an at least partially transparent light glass, and at least one light source arranged in the interior of the light housing;
   a vehicle system adapted to control a manner of driving the motor vehicle, wherein the vehicle system is selected from a group consisting of a throttle response system, a steering system, and a suspension system;
   a control device in operative communication with the motor vehicle light and the vehicle system, the control device configured to provide commands to operate the motor vehicle light and the vehicle system in at least two operating modes, wherein a first operating mode comprises a first set of driving properties associated with a sport mode of the vehicle system, a second operating mode comprises a second set of driving properties associated with a non-sport mode of the vehicle system, when operating in the first operating mode, the control device provides commands to the motor vehicle light to radiate light only by way of a first portion of the light glass to provide a first appearance associated with the sport mode and to the vehicle system to provide the first set of driving properties, when operating in the second operating mode, the control device provides commands to the motor vehicle light to radiate light by way of a second portion of the light glass which is at least partially different from the first portion to provide a second appearance associated with the non-sport mode and to the vehicle system to provide the second set of driving properties, wherein the second set of driving properties include at least one of a firmer suspension, more direct steering or more spontaneous throttle response; and
   a manual switch connected to the control device to specify the respective operating mode.

2. The motor vehicle according to claim 1, wherein the motor vehicle light has the same function in the first operating mode as in the second operating mode.

3. The motor vehicle according to claim 1, wherein the motor vehicle light has two light sources, a first light source being associated with the first operating mode and a second light source being associated with the second operating mode.

4. The motor vehicle according to claim 1, wherein an energy source is provided, which supplies the light source with electric energy.

5. The motor vehicle according to claim 1, wherein the motor vehicle light has a switch-over device, which is configured in such a way as to move at least one opaque covering screen into a first and a second position of the light glass, the first position being associated with the first operating mode and the second position being associated with the second operating mode.

6. The motor vehicle according to claim 1, wherein the motor vehicle light has a further light glass, the transparency of which is configured so as to be electrically variable.

7. The motor vehicle according to claim 6, wherein the further light glass has liquid crystals, the transparency of which changes depending on an applied voltage.

8. The motor vehicle according to claim 6, wherein the further light glass has at least one first and one second glass segment, the transparency of the two glass segments being electrically variable independently of one another.

9. The motor vehicle according to claim 6, wherein the further light glass is connected to the control device, which controls the operating modes.

10. The motor vehicle according to claim 6, wherein the further light glass is installed in the motor vehicle light instead of the at least partially transparent light glass.

11. The motor vehicle according to claim 1, wherein a selection device connected to the control device is provided to specify the first and second operating mode.

12. The motor vehicle according to claim 1, wherein the control device is connected to a display device, the display device displaying the respective existing operating mode.

13. The motor vehicle according to claim 1, wherein the motor vehicle light is a front light, a tail light, a brake light and a direction indicator.

14. The motor vehicle according to claim 1, wherein the lighting source is implemented as an incandescent lamp.

15. A method for operating a controllable exterior motor vehicle light of a motor vehicle, the method comprising the steps of:
   generating a light with the controllable exterior motor vehicle light, the controllable exterior motor vehicle light+ comprising a light source having at least one partially transparent light glass that can be operated in at least two operating modes, a first operating mode comprising a first set of driving properties associated with a sport mode, and a second operating mode comprising a second set of driving properties associated with a non-sport mode;
   radiating the light generated by the light source by way of a first portion of the at least partially transparent light glass in the first operating mode of the at least two operating modes, when a motor vehicle system of the motor vehicle is operated in the sport mode to provide a first appearance associated with the sport mode, the motor vehicle system adapted to control a manner of driving the motor vehicle, wherein the manner of driving is selected from a group consisting of the spontaneity of a throttle response system, the directness of a steering system, and the stiffness of a suspension system; and
   changing an appearance of the motor vehicle to a second appearance by radiating the light generated by the light source by way of a second portion of the at least partially transparent light glass in the second operating mode, wherein the second portion is at least partially different from the first portion, when the motor vehicle system changes operation from the sport mode to the non-sport mode, wherein the second appearance is associated with the non-sport mode, and the operating mode is elected by the user with a manual switch.

16. The method according to claim 15, wherein the light source comprises a first light source and a second light source, and the method further comprises the steps of:
   generating the light with the first light source in the first operating mode; and
   generating the light with the second light source in the second operating mode.

17. The method according to claim 15, further comprising the steps of:
   covering a first portion of the at least partially transparent light glass with an opaque covering screen in the first operating mode; and
   covering a second portion of the at least partially transparent light glass with the opaque covering screen in the second operating mode.

18. The method according to claim 15, further comprising the steps of:
   varying a transparency of a further light glass that is at least partially parallel to the at least partially transparent light glass in the first operating mode; and
   varying the transparency of the further light glass in the second operating mode.

19. The method according to claim 15, further comprising the step of varying characteristic properties of further systems contained in the motor vehicle in addition to the light depending on the existence of the first operating mode and the second operating mode.

* * * * *